(12) United States Patent
Shabtai et al.

(10) Patent No.: US 11,068,593 B2
(45) Date of Patent: Jul. 20, 2021

(54) USING LSTM ENCODER-DECODER ALGORITHM FOR DETECTING ANOMALOUS ADS-B MESSAGES

(71) Applicant: B. G. NEGEV TECHNOLOGIES AND APPLICATIONS LTD., AT BEN-GURION UNIVERSITY, Beer Sheva (IL)

(72) Inventors: Asaf Shabtai, Hulda (IL); Idan Habler, Jerusalem (IL)

(73) Assignee: B. G. NEGEV TECHNOLOGIES AND APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 143 days.

(21) Appl. No.: 16/053,659

(22) Filed: Aug. 2, 2018

(65) Prior Publication Data
US 2019/0042748 A1    Feb. 7, 2019

Related U.S. Application Data

(60) Provisional application No. 62/540,592, filed on Aug. 3, 2017.

(51) Int. Cl.
*G06F 11/00*    (2006.01)
*G06F 21/56*    (2013.01)
(Continued)

(52) U.S. Cl.
CPC ............ *G06F 21/566* (2013.01); *G06F 11/00* (2013.01); *G06F 21/554* (2013.01); *G06F 21/64* (2013.01);
(Continued)

(58) Field of Classification Search
CPC ...... G06N 3/0454; G06N 5/003; G06N 20/10; G06N 3/08; G06N 3/0427; G06N 7/005;
(Continued)

(56) References Cited

U.S. PATENT DOCUMENTS

| | | | |
|---|---|---|---|
| 2003/0093187 A1* | 5/2003 | Walker | B64D 45/0059 701/1 |
| 2008/0036659 A1* | 2/2008 | Smith | G08G 5/0082 342/454 |

(Continued)

OTHER PUBLICATIONS

On the Security of the Automatic Dependent Surveillance-Broadcast Protocol Martin Strohmeier, Vincent Lenders, Ivan Martinovic IEEE communication survey & tutorial. vol. 17, No. 2, pp. 1066-1087 (Year: 2014).*

(Continued)

*Primary Examiner* — Samson B Lemma
*Assistant Examiner* — Mohammad S Shams
(74) *Attorney, Agent, or Firm* — FisherBroyles, LLP; Robert Kinberg

(57) ABSTRACT

A method for detecting anomalous ADS-B messages in airplanes and air-traffic control system, comprising: extracting features from application level data, which is information broadcasted in said ADS-B messages, contextual data and flight plans; analyzing said extracted features and computing relative measures of a flight based on said extracted features; training a machine learning model to represent a benign ADS-B messages; applying said machine learning model on said extracted features thereby deriving a reputation score for said ADS-B message; issuing a decision based on said score, thereby recognizing an attack and issuing an alarm regarded said recognized attack.

6 Claims, 12 Drawing Sheets

(51) Int. Cl.
*G08G 5/00* (2006.01)
*G06N 20/00* (2019.01)
*G06F 21/55* (2013.01)
*G06N 3/04* (2006.01)
*G06N 7/00* (2006.01)
*G06F 21/64* (2013.01)
*G06N 3/08* (2006.01)
*G06N 20/20* (2019.01)
*G06N 5/00* (2006.01)
*G06N 20/10* (2019.01)

(52) U.S. Cl.
CPC ......... *G06N 3/0427* (2013.01); *G06N 3/0445* (2013.01); *G06N 3/0454* (2013.01); *G06N 3/08* (2013.01); *G06N 7/005* (2013.01); *G06N 20/00* (2019.01); *G08G 5/003* (2013.01); *G08G 5/0004* (2013.01); *G08G 5/0008* (2013.01); *G08G 5/0013* (2013.01); *G08G 5/0021* (2013.01); *G08G 5/0056* (2013.01); *G08G 5/0095* (2013.01); *G06F 2221/034* (2013.01); *G06N 5/003* (2013.01); *G06N 20/10* (2019.01); *G06N 20/20* (2019.01)

(58) Field of Classification Search
CPC ...... G06N 20/00; G06N 3/0445; G06N 99/00; G08G 5/003; G08G 5/0004; G08G 5/0056; G08G 5/0008; G08G 5/0095; G08G 5/0021; G08G 5/0013; G08G 5/00; G06F 21/566; G06F 2221/034; G06F 11/00; G06F 21/64; G06F 21/554; G06F 21/56
USPC .......................................................... 726/23
See application file for complete search history.

(56) References Cited

U.S. PATENT DOCUMENTS

| | | | |
|---|---|---|---|
| 2013/0139247 A1* | 5/2013 | Cianfrocca | H04L 63/0245 726/14 |
| 2013/0198119 A1* | 8/2013 | Eberhardt, III | G06N 7/005 706/12 |
| 2014/0327564 A1* | 11/2014 | Sampigethaya | G08G 5/0013 342/32 |
| 2016/0170025 A1* | 6/2016 | Johnson | H01Q 21/28 342/357.4 |
| 2016/0275801 A1* | 9/2016 | Kopardekar | G08G 5/0069 |
| 2017/0063886 A1* | 3/2017 | Muddu | H04L 63/1425 |
| 2017/0250953 A1* | 8/2017 | Jain | H04L 63/1458 |
| 2017/0301247 A1* | 10/2017 | Sherry | G08G 5/0091 |
| 2017/0358214 A1* | 12/2017 | Scarlatti | G08G 5/0013 |
| 2018/0053115 A1* | 2/2018 | Vachhani | G06Q 30/0204 |
| 2018/0204469 A1* | 7/2018 | Moster | B64C 39/024 |
| 2018/0239948 A1* | 8/2018 | Rutschman | G06K 9/46 |
| 2018/0248904 A1* | 8/2018 | Villella | G06N 3/088 |
| 2019/0012752 A1* | 1/2019 | Rockafellow | G06Q 50/184 |
| 2019/0033862 A1* | 1/2019 | Groden | G08G 5/0039 |
| 2019/0333395 A1* | 10/2019 | Borshchova | G08G 5/0013 |
| 2019/0385057 A1* | 12/2019 | Litichever | H04L 63/1416 |

OTHER PUBLICATIONS

Aviation Navigation System Security: ADS-B, GPS, IFF Jason Pollack, Prakash Ranganathan Department of Electrical Engineering & Mines University of North Dakota SAM'18: Int'l Conf. Security and Management, pp. 129-135 (Year: 2018).*

Is teaching with security in mind working? Svetlana Peltsverger, Orlando Karam InfoSecCd '10: 2010 Information Security Curriculum Development Conference. Oct. 2010, pp. 15-20. https://doi.org/10.1145/1940941.1940946 (Year: 2010).*

* cited by examiner

LIST OF EXTRACTED FEATURES

| Feature name | Value range | Unit | Description |
|---|---|---|---|
| Speed | [0, 500] | knt | Speed relative to the ground |
| Latitude | [-180, 180] | deg | The north-south position of a point on the Earth's surface |
| Longitude | [-90, 90] | deg | The east-west position of a point on the Earth's surface |
| Altitude | [0, 40000] | ft | Altitude above mean sea level |
| Heading | [0, 360] | deg | Compass heading |
| Points A-D | >0 | ft | Four features that indicate the Vincenty distance between each point in the route and the selected points (A,B,C,D) |

Fig. 3

TABLE III. RANGE-RING FEATURE EXTRACTION

| Feature name | | Description |
|---|---|---|
| Avg\Max\Min Speed | knt | Measurements of speed relative to the ground |
| Avg\Max\Min Distance | ft | Measurements of distance between all airplanes contained in the range-ring |
| Avg\Max\Min Altitude | ft | Measurements of altitude above mean sea level |
| No. of airplanes | int | Number of airplanes contained in the range-ring |

Fig. 6

TABLE IV. DESCRIPTION OF DATASETS

| Dataset Name | Description | Number of flights | Approx. flight duration | Dates of flights |
|---|---|---|---|---|
| London | Flights between Ben Gurion Airport, Israel and Luton Airport, London | 80 | 5 hours | May 15, 2017 – July 1, 2017 |
| Milano | Flights between Ben Gurion Airport, Israel and Malpensa Airport, Italy | 65 | 3.75 hours | March 7, 2017 – July 27, 2017 |
| Moscow | Flights between Moscow Sheremetyevo Airport, Russia and Heathrow Airport, London | 54 | 4 hours | May 3, 2017 – July 7, 2017 |
| Washington | Flights between San Francisco Airport, United States and Washington Dulles Airport, United States | 70 | 4.3 hours | April 10, 2017 – July 9, 2017 |
| Paris | Flights between Kiev Boryspil Airport, Ukraine and Paris Charles de Gaulle Airport, France | 68 | 3 hours | April 3, 2017 – July 9, 2017 |
| Las Vegas | Flights between Benito Juarez Airport, Mexico and Las Vegas McCarran Airport, United States | 80 | 3.3 hours | February 20, 2017 – July 7, 2017 |
| Thailand (used for generating anomalies) | A flight between Suvarnabhumi Airport, Thailand and Tashkent International Airport, Uzbekistan | 1 | 6 hours | July 6, 2017 |

Fig. 7

EXPERIMENT RESULTS – LONDON DATASET

|  | RND | ROUTE | SHIFT UP | SHIFT DOWN |
|---|---|---|---|---|
| Alarm delay | 1.0±0.0 | 1.0±0.0 | 26.91±2.15 | 26.49±2.42 |
| FPR | 5.56±1.30% | 5.48±1.41% | 5.34±1.38% | 5.34±1.30% |
| TPR | 98.43±1.30% | 97.13±0.23% | 36.87±4.10% | 45.12±3.99% |

Fig. 9A

EXPERIMENT RESULTS – MILANO DATASET

|  | RND | ROUTE | SHIFT UP | SHIFT DOWN |
|---|---|---|---|---|
| Alarm delay | 1.0±0.0 | 1.0±0.0 | 33.17±1.17 | 29.34±1.45 |
| FPR | 5.75±2.04% | 5.75±2.04% | 5.47±2.05% | 5.47±2.05% |
| TPR | 98.44±0.00% | 98.44±0.00% | 43.14±2.20% | 51.92±2.43% |

Fig. 9B

EXPERIMENT RESULTS – MOSCOW DATASET

|  | RND | ROUTE | SHIFT UP | SHIFT DOWN |
|---|---|---|---|---|
| Alarm delay | 1.0±0.0 | 1.0±0.0 | 33.333±2.04 | 28.816±2.92 |
| FPR | 4.2±1.46% | 4.2±1.46% | 3.87±1.45% | 3.87±1.46% |
| TPR | 98.82±0.06% | 98.82±0.06% | 59.04±2.30% | 65.47±2.23% |

Fig. 9C

EXPERIMENT RESULTS – WASHINGTON DATASET

|  | RND | ROUTE | SHIFT UP | SHIFT DOWN |
|---|---|---|---|---|
| Alarm delay | 1.0±0.0 | 1.0±0.0 | 35.68±2.28 | 30.97±2.70 |
| FPR | 5.14±1.15% | 5.1±1.15% | 4.86±1.15% | 4.87±1.00% |
| TPR | 98.80±0.00% | 98.80±0.00% | 55.52±3.12% | 63.06±3.67% |

Fig. 9D

EXPERIMENT RESULTS – PARIS DATASET

|  | RND | ROUTE | SHIFT UP | SHIFT DOWN |
|---|---|---|---|---|
| Alarm delay | 1.0±0.0 | 1.0±0.0 | 37.44±5.30 | 31.74±2.14 |
| FPR | 5.39±2.78% | 5.39±2.78% | 4.96±2.71% | 5.15±2.80% |
| TPR | 98.84±0.00% | 98.84±0.00% | 51.93±6.96% | 61.37±2.28% |

Fig. 9E

EXPERIMENTS RESULTS – LAS VEGAS DATASET

|  | RND | ROUTE | SHIFT UP | SHIFT DOWN |
|---|---|---|---|---|
| Alarm delay | 1.0±0.0 | 1.0±0.0 | 35.45±2.72 | 34.50±3.86 |
| FPR | 5.52±0.92% | 5.52±0.92% | 5.20±0.91% | 5.20±0.91% |
| TPR | 98.80±0.00% | 98.80±0.00% | 49.49±3.37% | 48.95±5.74% |

Fig. 9F

AVERAGE FALSE ALARM RATE

| Dataset Name | r=5 | r=10 | r=15 |
|---|---|---|---|
| London | 4.70 | 1.26 | 0.55 |
| Milano | 8.70 | 2.21 | 0.57 |
| Moscow | 2.51 | 0.75 | 0.53 |
| Washington | 4.20 | 2.28 | 1.28 |
| Paris | 2.35 | 0.35 | 0.05 |
| Las Vegas | 0.20 | 0.11 | 0.05 |

Fig. 11

USING LSTM ENCODER-DECODER ALGORITHM FOR DETECTING ANOMALOUS ADS-B MESSAGES

CROSS-REFERENCE TO RELATED APPLICATIONS

This application claims priority to U.S. Provisional Application No. 62/540,592 filed on Aug. 3, 2017, the disclosure of which is incorporated herein by reference in its entirety.

FIELD OF THE INVENTION

The invention is in the field of data security system. More specifically, the invention relates to using machine learning algorithm for detecting anomalous ADS-B messages.

BACKGROUND OF THE INVENTION

Although the ADS-B system is going to play a major role in the safe navigation of airplanes and air traffic control (ATC) management, it is also well known for its lack of security mechanisms. Previous research has proposed various methods for improving the security of the ADS-B system and mitigating associated risks. However, these solutions typically require the use of additional participating nodes (or sensors) (e.g., to verify the location of the airplane by analyzing the physical signal) or modification of the current protocol architecture (e.g., adding encryption or authentication mechanisms.) Due to the regulation process regarding avionic systems and the fact that the ADS-B system is already deployed in most airplanes, applying such modifications to the current protocol at this stage is impractical. In this paper we propose an alternative security solution for detecting anomalous ADS-B messages aimed at the detection of spoofed or manipulated ADS-B messages sent by an attacker or compromised airplane. The method of the invention utilizes an LSTM encoder-decoder algorithm for modeling flight routes by analyzing sequences of legitimate ADS-B messages. Using these models, aircraft can autonomously evaluate received ADS-B messages and identify deviations from the legitimate flight path (i.e., anomalies).

Over the last decade, there has been a significant increase in the number of flight movements around the world, with an average of approximately 100,000 registered flight movements per day, estimated by the International Air Transport Association (IATA) in 2015. Due to the growing need for civilian flights and the adoption of unmanned aerial vehicles (UAC), the number of registered flight movements around the world undoubtedly continues to increase. In fact, according to IATA forecasts, this number is predicted to soar and will likely double by 2035.

In order to provide safe navigation and reduce the cost of air traffic control (ATC), the aviation community has been moving from uncooperative and independent air traffic surveillance, such as Primary Surveillance Radar (PSR) or Secondary Surveillance Radar (SSR), to cooperative and dependent air traffic surveillance (CDS), such as ADS-B.

Automatic Dependent Surveillance-Broadcast (ADS-B) is a modern implementation of SSR certified by the International Civil Aviation Organization (ICAO) and the Federal Aviation Administration (FAA) which is expected to play a major role in aviation in the future. The ADS-B system provides the ability to continuously and precisely localize aircraft movements in dense air space. An aircraft equipped with an ADS-B transponder (transmitter-responder) is capable of deriving its position from the navigation satellite system, and then broadcasts the aircraft's flight number, speed, position, and altitude at an average rate of 4.2 messages per second. Unlike issues of cost and accuracy, which were major considerations in the development of ADS-B, security was pushed to the sidelines. This resulted in a widely used technology with highly compromised security, particularly in terms of the protocol mechanism, as follows:

No message authentication: messages are not broadcast with an authentication code or digital signature and therefore can be replayed, manipulated, or forged.

No message encryption: messages are broadcast as plain text and therefore can be easily eavesdropped.

No aircraft authentication: authorized aircraft or ATC stations don't have to authenticate before transmitting; thus, there is no way to distinguish between authorized and unauthorized entities. As a result, an unauthorized entity can inject messages or tamper with an authorized entity's reports.

A research has demonstrated that it is relatively easy to compromise the security of ADS-B with off-the-shelf hardware and software. The ability to exploit the ADS-B system endangers billions of passengers every year, and therefore there have been attempts by academia and industry to develop solutions that address the lack of security.

Past research suggested the use of encryption, aircraft authentication via challenge-response, and message authentication, in order to provide secured message broadcast and prevent eavesdropping. Besides securing broadcast communication, additional approaches focused on verifying velocity and location reports via additional sensors or nodes. However, most of those solutions require modifications to the architecture in order to enable key exchange or establish trust between entities. Since the FAA has mandated the use of ADS-B for all aircraft movements within the US airspace by 2020, a requirement that already exists for some aircraft in Europe, and due to the strict regulation process regarding the implementation of avionic systems, applying modifications to the current protocol at this stage is impractical (note that the ADS-B protocol design and development began in the early 1990s).

Therefore, there is a need to provide an alternative security solution for detecting anomalous ADS-B messages.

It is therefore an object of the invention to provide a security solution to ADS-B systems.

It is another object of the present invention to provide a security solution to ADS-B systems, which does not require modifications or additional participating nodes and/or sensors to the architecture of the system and to enables aircraft to detect anomalies in the dense air space autonomously.

Other objects and advantages of the invention will become apparent as the description proceeds.

SUMMARY OF THE INVENTION

The invention related to a method for detecting anomalous ADS-B messages in airplanes and air-traffic control system, comprising:
  a. extracting features from application level data, which is information broadcasted in said ADS-B messages, contextual data and flight plans;
  b. analyzing said extracted features and computing relative measures of a flight based on said extracted features;
  c. training a machine learning model to represent a benign ADS-B messages;

d. applying said machine learning model on said extracted features thereby deriving a reputation score for said ADS-B message;

e. issuing a decision based on said score, thereby recognizing an attack and issuing an alarm regarded said recognized attack.

In an embodiment of the invention, the information broadcasted in the ADS-B messages relates to aircraft ID, altitude, location, speed, heading and wherein the contextual data relates to weather, type of plane, airline and destination.

In an embodiment of the invention, deriving a reputation score is done using one or more of the following methods:

a. analyzing a correlation between the data in the ADS-B message;

b. learning a profile of a flight route using a machine learning model by using previous ADS-B messages flights reports of the same route;

c. modeling all airplanes in a specific geolocation and time frame based on said airplanes ADS-B reports and detect anomalous reports; and d. using current flight plans and correlate said plans with the ADS-B messages of said airplane.

In an embodiment of the invention, the methods for deriving a reputation score are combined to issue a decision.

In an embodiment of the invention, the machine learning model applied is a Markov model or sequence mining algorithms.

In an embodiment of the invention, the machine learning model applied is a deep learning model.

In an embodiment of the invention, the deep learning model is a ANN architecture.

BRIEF DESCRIPTION OF THE DRAWINGS

FIG. 3 schematically shows a table, which presents the extracted attributes of an ADS-B message according to an embodiment of the present invention;

FIG. 6 schematically shows a table of range-ring feature extractions from a geolocation view of a specific area according to an embodiment of the invention;

FIG. 7 schematically shows a table, which presents the extracted datasets in the experiments according to an embodiment of the invention;

FIGS. 9A-9F schematically show results of the experiments according to an embodiment of the invention;

FIG. 11 schematically shows a table of average false-alarm rate of the experiments of the present invention according to an embodiment of the invention.

DETAILED DESCRIPTION OF THE EMBODIMENT OF THE INVENTION

Figure 1:
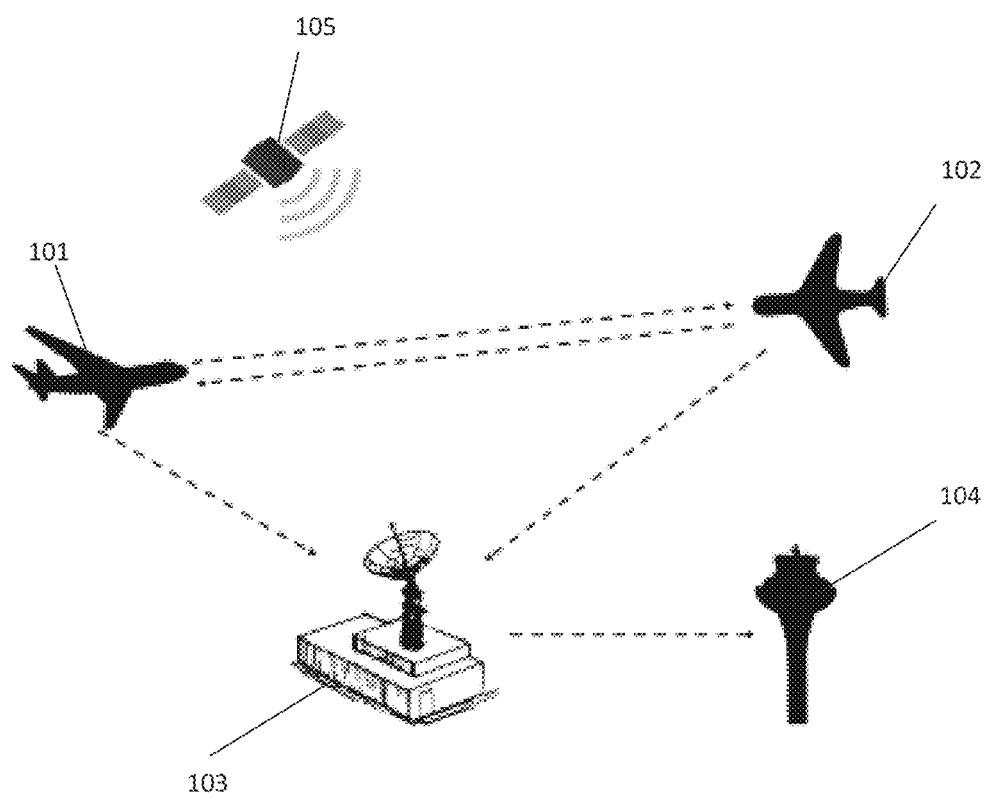
FIG. 1 schematically shows an illustration of the ADS-B system according to an embodiment of the invention.

The method described herein provides an alternative security solution for detecting anomalous ADS-B messages; specifically, the approach of the method is aimed at detecting spoofed or manipulated ADS-B messages sent by an attacker or compromised airplane. The method described herein does not require any modification or additional participating nodes and/or sensors, and enables aircraft to detect anomalies in the dense air space autonomously. The approach of the described method is designed to address message spoofing by observing a sequence of messages and estimating its credibility.

Each ADS-B message includes information such as aircraft ID, altitude, location, speed, heading, etc.

The method analyzes application level data, which in fact is the actual information broadcasted in the ADS-B messages, contextual data (weather, type of plane, airline, destination . . . ) and flight plans.

In the next step machine learning and data mining methods are applied on these data in order to derive a reputation score for ADS-B messages.

Four examples of methods for deriving a reputation scores are:

1. analyze the correlation between the data in the ADS-B message (and also previous messages) to derive the reputation. For example, if the altitude of the airplane at a specific time is 10000 feet and 10 seconds before it was reported in a message to be 2000 feet, then it is unusual and will be assigned with low reputation and recognized as a malicious message.

2. learn the profile of a flight route by using previous ADS-B flights reports of the same route. In the experiments made by the inventors an LSTM encoder-decoder model was used however other machine learning models that learns sequences can be used as well (e.g., Markov models, other RNNs architectures, sequence mining algorithms).

3. model all aircrafts in a specific geolocation and time frame based on their ADS-B reports and detect anomalous reports. For example: by representing it as a picture and apply CNN algorithm). It can also be modeled in other ways and respectively other machine learning algorithms can be applied.

4. Use flight plans and correlate it with the ADS-B messages of the aircraft.

In an embodiment of the invention, one or more methods for deriving a reputation score for ADS-B messages is used to provide a decision. In another embodiment, all methods can be combined together to a final decision.

In an embodiment of the invention, the method comprises a first step of data extraction on the high level of application level, where contextual features are extracted. The second step is to analyze the extracted feature and compute relative measures of the flight based on the extracted features. Then in the third step a machine learning algorithm is trained to represent a benign ADS-B messages and in the fourth step the LSTM encoder-decoder model is applied on the extracted features to derive a reputation score for the examined ADS-B message. In the last step, a decision is issued based on the score derived and the model recognizes an attack and issues an alarm regarding the recognized attack.

In an embodiment of the invention, the data extraction of the described method is done on a high level of the application level, in contrast to data extraction from the low level (the signal level). The features extracted are contextual features, which are analyzed and processed to provide additional relative measurements, which are all used together in a deep learning model LSTM (long short-term memory) encoder-decoder, which finally detects the anomalies in the ADS-B messages.

In order to be able to differentiate between normal and anomalous windows, the extraction of meaningful features that provide the context of the flight is required.

In an embodiment of the invention, the data extraction step is unique in that it is based on high level data on the application level, i.e., the extracted data relates to data that can be provided on a contextual base, or data received as a part of the airplane data transmission messages. In general the data can be extracted from one of following sources:
  a. Flight route—analyzing the flight route from past flight in the same route and detecting an anomaly in the flight route.
  b. Flight plans—analyzing a mass of flight programs with data about the flight itself and checking if the flight messages are compatible with the location and time according to the flight program.
  c. Geolocation image—analyzing the geographic image of airplanes in a specific geolocation and analyzing the airplanes behavior in that area for example: the average altitude, the proximity between planes, etc.
  d. Messages cross-features analysis—Analyzing each message relating to itself by checking the compatibility of different features from said same message, for example: checking that the velocity and direction of the airplane is compatible with the altitude of the airplane.

The data can be extracted from one or more of the sources described or from any other sources which provides valuable contextual data. It can also be extracted from one source and then to use the extracted data during the use of another source of data, for example extracting data from the flight route and then using the extracted data in another approach of extracting data from geolocation image.

Since flights between airports usually take place via similar routes, the method and system of the invention use and train an LSTM (long short-term memory) encoder-decoder model based on previous (legitimate) flights for a given route. Using such a model, each aircraft can independently evaluate received ADS-B messages and identify deviations from the legitimate flight path (i.e., anomalies). The method was examined using six datasets, each dataset contains flight information for a selected route. In the experiment different types of anomalies (erroneous data) were injected into the data and demonstrated that the approach of the described system and method was able to detect all of the injected attacks with an average of 4.303% false alarm rate. In addition, the alarm delay was measured as the number of messages sent from the moment the attack started until detection. The advantages of the described method and system are as follows. First, to the best of the inventor's knowledge, the utilization of machine learning techniques to secure the ADS-B protocol is novel; specifically, it is shown that sequences of ADS-B messages can be modeled by using the LSTM encoder-decoder algorithm. Second, it is shown that the LSTM encoder-decoder model can be used to amplify anomalies and thus facilitates the detection of anomalous messages. Third, the method and system described herein can overcome ADS-B shortcomings, particularly in the case of spoofed/fake messages, using standalone solutions that do not require architecture changes and can be applied by each aircraft independently. Finally, the model of the method is adaptive and flexible, so it can be trained and applied to new routes.

Automatic dependent surveillance-broadcast (ADS-B) is a satellite-based 'radar-like' system that automatically, independently, and continuously derives the aircraft's position from the global navigation satellite system (e.g., GPS, GLONASS, and Galileo) and broadcasts the data to nearby aircraft and ground stations. ADS-B was developed in order to improve air traffic control and was rolled out as a replacement to traditional primary/secondary radar. Providing improved accuracy and greater coverage in both radar and non-radar environments (e.g., mountain areas and oceans), ADS-B is designed to prevent collisions and improve utilization and throughput of aircraft in dense airspace.

The system includes two subsystems: ADS-B Out and ADS-B In. The ADS-B In subsystem enables aircraft to receive broadcast messages of other nearby aircraft. The ADS-B Out subsystem enables aircraft to continually broadcast messages. The system enables an aircraft to broadcast unencrypted messages that provide the position of the aircraft, its velocity, and its altitude, as well as additional information, using the ADS-B Out subsystem. The transmitted messages are processed by nearby aircraft and ATC stations on the ground using the ADS-B In subsystem.

FIG. 1. schematically shows an illustration of the ADS-B system according to an embodiment of the invention. Position of aircraft 101 is provided by the Global Navigation Satellite System 105 (GNSS), processed by the aircraft 101, and broadcast by the ADS-B Out subsystem. Ground station 103 and nearby aircraft 102 receive these messages via the ADS-B In subsystem. Ground station 103 then transmits the aircraft's data to ATC 104.

The ADS-B system is lacking basic security mechanisms such as authentication, message integrity, and encryption. In light of the need for real-time information, these security gaps make the application of the protocol in the crowded skies risky, exposing aircraft to the following types of attacks:
  Eavesdropping: The lack of message encryption and insecure broadcast transmissions makes eavesdropping over the medium by both adversaries (e.g., potential terrorist groups) and non-adversaries (e.g., commercial Internet websites) easy, allowing outsiders to track air traffic. The act of eavesdropping plays a major role in sophisticated attacks by providing real-time data of aerial traffic in the sky.
  DoS: Denial of Service attacks can have a significant impact on real-time systems like ADS-B. For example, a jamming attack, in which a single participant is prevented from sending or receiving messages by an attacker sending high power messages on the 1090 MHz frequency and in greater volumes could wreak havoc on the ADS-B system.
  Spoofing via message injection/deletion: Since there are no challenge-response mechanisms in the ADS-B system, neither entities (sender and receiver) are authenticated. Thus, an attacker can broadcast forged messages using low cost commercial off-the-shelf (COTS) software, impersonate an authorized entity, or even inject ghost aircraft information. In addition, the lack of challenge-response mechanism enables an attacker to exploit the system and inject collected ADS-B messages in replay attacks.

Understanding the adversary model is essential in order to estimate an attacker's capabilities of performing the attacks mentioned above. There are two kinds of attackers:

External attacker—an external attacker is an adversary that can execute simple attacks using COTS transponders (e.g., an attacker on the ground, a passenger on an aircraft, or an unmanned aerial vehicle). The possibility to conduct such an attack by an external attacker is made easier, because in order to transmit signals, one does not have to authenticate or belong to a specific airline. Therefore, while standing on the ground, an external attacker could receive and transmit signals, and perform DoS, eavesdropping, and spoofing attacks, however, there are several approaches to detect an attacker in this situation (e.g., measuring the Pearson correlation coefficient between the claimed aircraft's position and the received signal strength). More complicated attacks performed via UAVs or drones will be much harder to detect via signal analysis.

Internal attacker—an internal attacker is an adversary that has achieved access to the system and affects its behavior (e.g., an ATC crew member or aircraft maintenance worker). An internal attacker can manipulate the data processing phase or disrupt the system modules.

In an embodiment of the invention the following is an example on one possible implementation of the method of the invention. Detecting anomalies using standard approaches of predictive models, especially when detecting anomalies in a time series, is a challenging task, since the context of the current sample and its past may influence its value. Therefore, an LSTM encoder-decoder algorithm was chosen to be used in this example, in order to profile flight routes and detect anomalies. The use of applying machine learning (specifically deep learning models) does not require modifications to the current architecture of the ADS-B system or additional participating nodes. This allows the aircraft to autonomously and independently analyze ADS-B messages for anomaly detection.

An ADS-B window of size n is defined as a sequence of n consecutive ADS-B messages. A malicious window is defined as a window which includes at least one spoofed ADS-B message. The window containing all messages of a flight from the i-th message to the i+n message is denoted by $W[i, n] = \{x^{(i)}, x^{(i+1)} \ldots x^{(i+n)}\}$. Each entry $x^{(j)}$ is a vector consisting of features extracted for message j during the flight.

The LSTM encoder-decoder algorithm is utilized for detecting anomalous (malicious) windows. This is done by training an encoder-decoder model for a route from takeoff point A to landing point B. During the training phase the model is fitted to reconstruct normal (benign) windows of flights from point A to point B. For each tested window, first a LSTM is used in order to encode the sequence of ADS-B messages (where each message is represented by the vector of features) to a fixed dimension vector (i.e., sequence to sequence model). Then, a decoder based on LSTM is used to decode and reconstruct the tested window. When the model reconstructs an anomalous window it may not reconstruct the sequence well and will therefore amplify the reconstruction error.

FIG. 3 schematically shows a table, which presents the extracted features of an ADS-B message according to an embodiment of the present invention. First are extracted the aircraft's speed, geolocation (latitude/longitude), altitude, and heading from each message.

In order to provide contextual flight-progress, also representative features for each flight are extracted. This is done by computing the average path of a route (using previous legitimate flight records) and extracting four major geolocation points for each source and destination:

Point A—Takeoff (start of the route).
Point B—The first point of cruising behavior.
Point C—The last point of cruising behavior.
Point D—Landing (end of the route).

Figure 2:
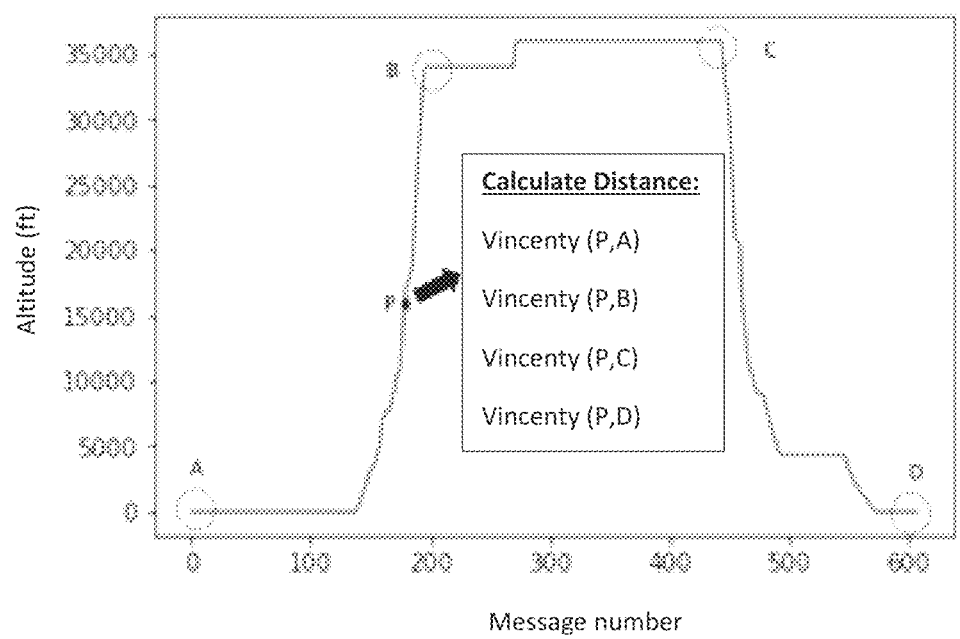
FIG. 2 schematically shows an example of an average flight from the London dataset according to an embodiment of the invention.

FIG. 2. Schematically shows an example of an average flight from the London dataset according to an embodiment of the invention. For each point P in the flight, the Vincenty distance from points A, B, C, and D is calculated.

Afterwards, the distance between each point in the route is measured (latitude, longitude, as received by the messages) and the aforementioned major points A, B, C and D (see FIG. 2) using the inverse method of Vincenty's distance formulae on a spherical earth.

The machine-learning model of the invention comprises a training stage before it can be used.

An LSTM encoder-decoder model is trained to reconstruct windows of benign sequences with minimal error; i.e., the model attempts to output the same input sequence of vectors. This is achieved by using an LSTM encoder that learns from fixed length sequences of messages (each message is represented by the vector of features) by optimizing the hidden layer ($H_D$). The LSTM decoder reconstructs the window using the current hidden state of the decoder ($H_D$) and the values predicted in the previous message.

Figure 4:
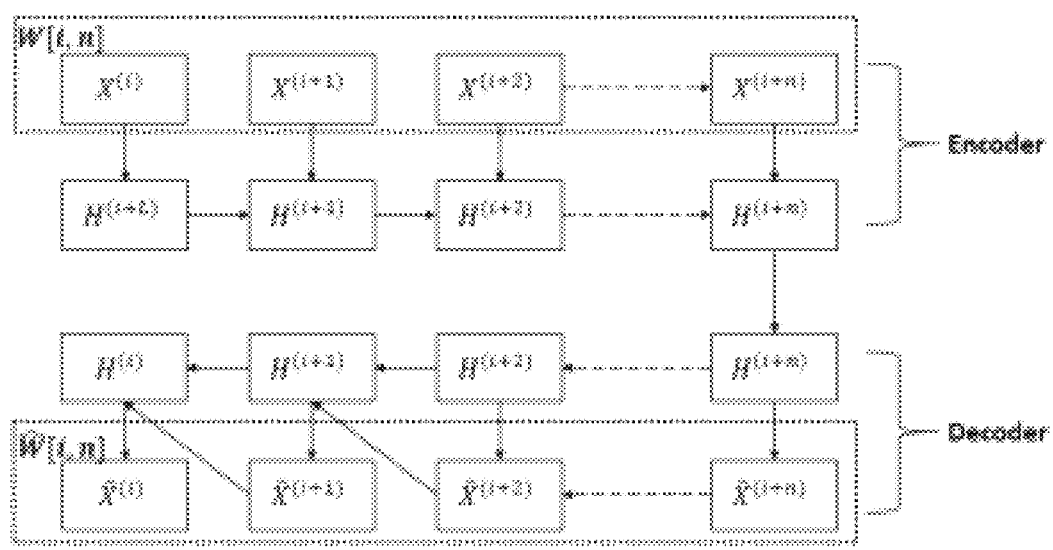
FIG. 4 schematically illustrates the LSTM-based encoder-decoder according to an embodiment of the present invention.

FIG. 4. schematically illustrates the LSTM-based encoder-decoder. The steps for obtaining the prediction of window $\hat{W}[i, L]$ from input window are as follows: at the first step 401 the encoder encodes the input vectors into a fixed sized vector, and at the second step 402 the decoder decodes the fixed sized vector in an attempt to reconstruct the original window. In the case of an anomaly, the anomaly will be amplified, and $\hat{W}[i, L]$ will not be identical to $W[i, L]$.

Since during the training phase the model is trained to reconstruct a legitimate sequence of messages (i.e., a window), it is expected both of the model's inputs and outputs to look alike. In contrast, when the model is applied on a malicious window (i.e., containing spoofed messages), it is expected that the model fails at reconstructing a legitimate sequence of messages, and therefore input vectors (input window) and output vectors (predicted window) will differ significantly. After predicting the output window corresponding to the target input window, the reconstruction error of each vector representing an ADS-B message is obtained using the Cosine similarity (see Equation 1). The overall anomaly score of the input window is computed according to Equation 2.

$$CosSimilarity(x, \hat{x}): \frac{\sum_{i=1}^{n} x_i \hat{x}_i}{\sqrt{\sum_{i=1}^{n} x_i^2} \sqrt{\sum_{i=1}^{n} \hat{x}_i^2}} \quad (1)$$

$$Anomaly(W[i, L]) = \sum_{i=1}^{(i+L)} (1 - CosSimilarity(x^j, \hat{x}^j)) \quad (2)$$

While deviations from a specific route can be identified by an LSTM encoder-decoder as a local point of view obtained by a model adapted to the route, the method and system described herein adds an additional, global, point of view that is obtained by extracting features and data from another source of geolocation image, where the airspace state is analyzed in order to detect deviations from legitimate density or expected behavior among aircraft around a measured radius.

Characterizing the air space can be done, for example by creating images of the sky in the measured radius. This is done by applying map projection of the geolocation reports obtained from the ADS-B messages, each sequence of images represents a view of a different time at a different day of the week as can be seen in FIG. 5.

In order to distinguish between benign and malicious behavior, vector representation of each sequence of images can be extracted by the use of convolution neural network (CNN). Second, in addition to the image embedding vector received by the CNN, additional features of the measured radius, for each time segment (image) are extracted.

Figure 5:
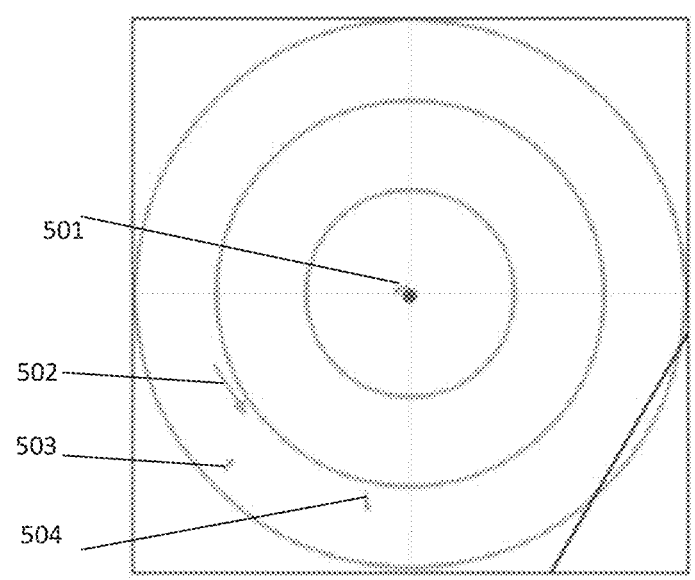
FIG. 5 schematically shows an example of a Radar image depicting the aerial status in a 50 km radius, originating from the airport, according to an embodiment of the present invention.
Figure 8A:
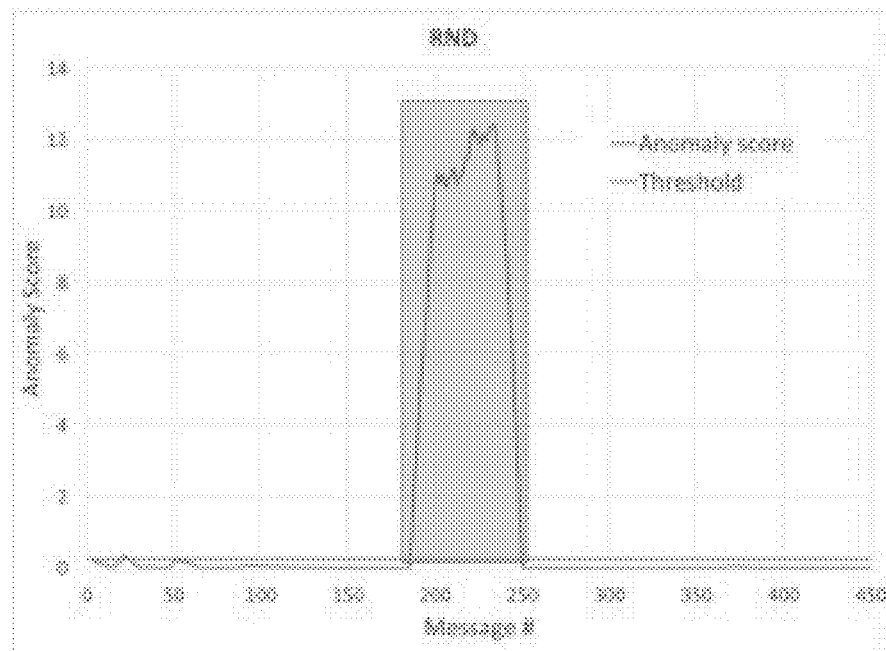
FIGS. 8A-8D schematically show a graphical representation of the anomaly score for each type of attack for a single representative flight, randomly chosen from the London dataset according to an embodiment of the invention.
Figure 8B:
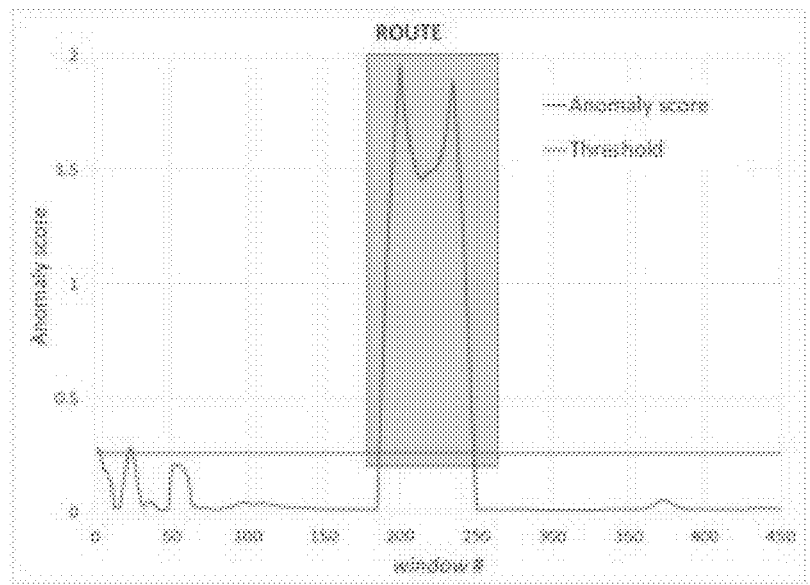
Figure 8C:
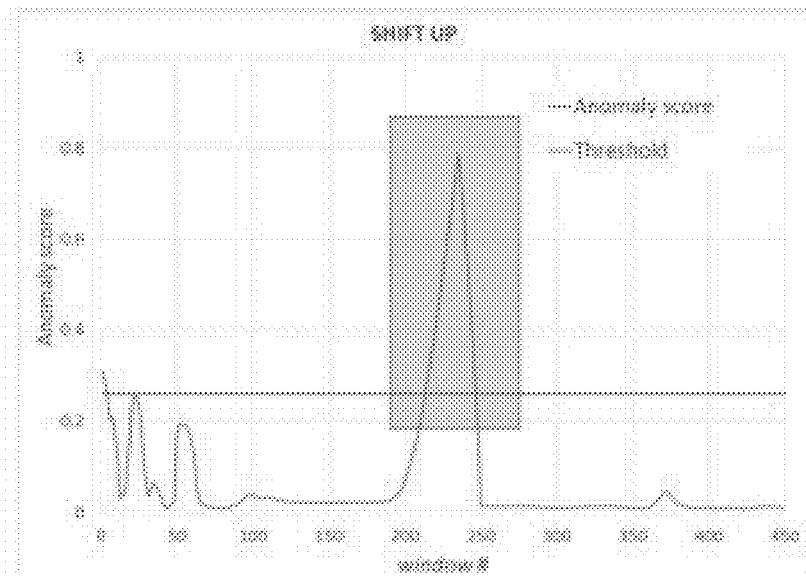
Figure 8D:
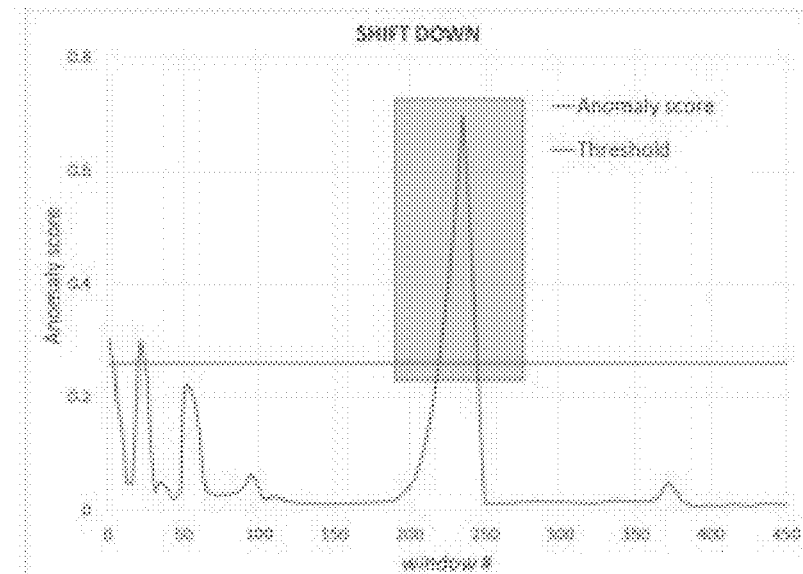

FIG. 5 schematically shows an example of a Radar image depicting the aerial status in a 50 km radius, originating from the airport. Each arrow (501, 502, 503, 504) in the image represents an aggregation of ADS-B reports of an aircraft within a specific time period. The direction of the arrowhead indicates the heading of the aircraft, the size of the arrows indicates the altitude of the aircraft, the length of arrow indicates the distance traveled by the aircraft within the time period and the color of the arrow can indicate the reputation score derived for this aircraft report by the other reputation score approach mentioned.

FIG. 6 schematically shows a table of range-ring feature extractions according to an embodiment of the invention from a geolocation view of a specific area, such as the Radar image presented at FIG. 5. By analyzing the received ADS-B messages at the appropriate time segment, both behavioral and statistical features are extracted, as presented at Table presented in FIG. 6. By the use of the representative features obtained from the image processing and the raw data analysis, this approach can be useful for detecting deviations in the density of aircraft in the radius, such as DoS attacks (e.g., ground station flooding and ghost aircraft flooding). Moreover, this approach can be used as an assessment to the reliability of the reports in the measured radius.

In another embodiment of the invention, the step of data and feature extraction is done by message cross-feature analysis. The goal of this approach is to authenticate the values of features of each ADS-B message. The assumption is that there is a correlation between the different features reported in each ADS-B message; such correlation can be modeled by using machine learning algorithms; for example, by applying auto-encoders or by using the regression-based cross-feature analysis approach. The hypothesis is that a change in one feature (e.g., speed of the aircraft) will be observed in other features (e.g., altitude) that are both dependent on the type of the aircraft (small or big). Regression analysis allows the system of the invention to assess the relationships among variables.

In order to estimate the reliability of information reported by an aircraft, the different types of regressors are examined over the raw data provided in ADS-B messages. Since ADS-B messages contains contextual features of a flight, it is reasonable to believe that might be correlation between different parts of information transmitted by the same transmitter. ADS-B messages includes velocity, heading of the aircraft, altitude, longitude, latitude and the ICAO of the aircraft, hence features based on altitude and velocity information are extracted, and deep learning models are examined as well as state-of-art regression algorithms, e.g. DecisionTreeRegressor, XGBoost, Random Forest, SVR and NuSVR.

In an embodiment of the invention, the method described only requires feeds of ADS-B messages (provided by the ADS-B system) and visualizing classification outputs and anomalies, it can be integrated as certified software within any ADS-B visualization system developed by manufacturers. This includes, for example, integrating the system of the invention as an additional application that is installed on the electronic flight bag (EFB) server. The EFB is a mission-critical system (hardware and software platform) used by pilots on civil aircraft. The EFB provides important information on board by running various applications that offer the flexibility and availability of real-time information to pilots during flight and on the ground. Examples of such applications include airport charts and maps, operational manuals, flight planning, checklists, performance calculations, weather information, video flight deck surveillance, as well as information provided by the ADS-B system. The method described herein may be implemented in the form of a dedicated application that is installed on the EFB and processes the ADS-B data and applies the anomaly detection mechanism; without requiring any change in the ADS-B system itself.

EXPERIMENTS

The described method was examined on six different flight route datasets to which different types of anomalies were injected. Using the described method, all of the injected attacks were detected with an average false alarm rate of 4.3% for all of datasets.

The inventors conducted a set of experiments in order to evaluate the method and system described herein, and more specifically, the ability of the method to model an arbitrarily chosen route and use this model to deduce whether a given flight (or a segment of the flight) is benign or an anomaly.

Collected dataset: a large-scale dataset was used from the online flight tracking network, FlightRadar24, 3 for the evaluation. FlightRadar24 provides access to data collected from thousands of ground stations. The extracted datasets are presented in the table of FIG. 7.

Injected anomalies: In order to evaluate the performance of the learned model, three types of anomalies were injected (a segment of 70 sequential messages, from message 180 to message 250) into the flights included in the test sets:

Random noise (RND)—anomalies are generated by adding random noise where the original values of the message attributes of the ADS-B messages are multiplied with a randomly generated floating number between 0 and 2.

Different route (ROUTE)—anomalies are generated by replacing a segment of the ADS-B messages of the tested flight with a segment of messages from a different (legitimate) route. In the evaluation, a segment from the flights in our datasets was replaced with a segment from the flight between Suvarnabhumi Airport, Thailand and Tashkent International Airport, Uzbekistan (the Thailand dataset).

Gradual drift (DRIFT)—anomalies are generated as a gradual drift in the altitude feature. This is done by modifying the altitude of a segment of messages by continuously raising/lowering the altitude by an increasing multiplier of 400 feet (i.e., for the first message in the anomalous segment the altitude will be increased/decreased by 400 feet, the second message will be increased/decreased by 800 feet, and so on). In the evaluation two types of gradual drifts were generated by lowering the altitude value (denoted as SHIFT Down) and raising the altitude value (denoted as SHIFT Up). By selecting and evaluating these types of anomalies it is able to represent two types of attackers. The first, is a naïve adversary (RND and ROUTE anomalies) with the goal of adding observable noise to the air-space view in order to reduce the credibility of the ADS-B system and disrupt the traffic management. The second adversary is less aggressive and more sophisticated that attempts to influence the air-space view by adding reasonable (less observable) gradually-drifted messages (in location or altitude) which may result in a collision in air.

In an embodiment, the experiments were conducted using the 10-fold cross-validation approach as follows. The flights of each dataset were divided into 10 folds, each containing an equal number of flights (eight flights in the London dataset, seven flights in the Washington dataset, six flights in Milano dataset, etc.) For each fold i and dataset DS (London, Milano, Moscow, Washington, Paris, and Las Vegas) the training set includes all of the flights in DS, excluding the flights of the i-th fold (denoted by $Train_i^{(DS)}$); the flights of the i-th fold are used for testing (denoted by $Test_i^{(DS)}$). The $Test_i^{(DS)}$ dataset was duplicated four times; for each copy, a set of malicious windows were injected (as mentioned from message 180 to message 250) according to the four types of anomalies (one type of anomaly for each copy). We denote these datasets by:

$Test_{I,RND}^{(DS)}$, $Test_{I,ROUTE}^{(DS)}$, $Test_{I,SHIFT\ UP}^{(DS)}$, $Test_{I,SHIFT\ DOWN}^{(DS)}$.

In the experiments the window size (i.e., the size of the sequence input to the LSTM encoder-decoder model) was set at L=15. In addition, in order to evaluate the model derived from the training set, we defined a window that contains 15 messages as a malicious window if it contains at least one spoofed message. In order to set the threshold value for an anomalous window, 5-fold cross-validation evaluation were performed on $Train_i^{(DS)}$. Since the $Train_i^{(DS)}$ dataset includes benign flights only, the anomaly scores (computed according to Equation 2) are obtained and the value that exceeds 95% of the errors are defined as the threshold value for the testing phase of:

$Test_{I,RND}^{(DS)}$, $Test_{I,ROUTE}^{(DS)}$, $Test_{I,SHIFT\ UP}^{(DS)}$, $Test_{I,SHIFT\ UP}^{(DS)}$.

To assess the performance of the models, the corresponding false positive rate (FPR), true positive rate (TPR), and the alarm delay of the model (measured as the number of messages from the beginning of the attack until a malicious window is detected) were examined.

FIGS. 8A-8D schematically show a graphical representation of the anomaly score for each type of attack for a single representative flight, randomly chosen from the London dataset according to an embodiment of the invention. It illustrates the increase in the anomaly score as the anomaly becomes more significant. This is because the evaluated input window contains an increasing number of anomalous messages. The Gradual Drift anomaly (SHIFT DOWN) of the same selected flight is also visualized on top of a geographical map in FIG. 10. Each icon indicates a window of ADS-B messages where the actual location is set according to the location of the last ADS-B message in the window. The size of the icon indicates the reported altitude of the aircraft and the color of the icon indicates the anomaly level derived by the relevant model (trained on the London dataset); Red being an anomalous window and Green benign window.

The results of the experiments are presented in FIGS. 9A to 9F. The tables in FIG. 9A-9F show the average and standard deviation of the FPR (False Positive Rate), TPR (True Positive Rate), and alarm delay time for each type of attack. It can be inferred from the results that the proposed model can efficiently predict an ongoing anomaly, while the alarm delay time changes according to the attack's aggressiveness. As can be seen, attacks of type RND and ROUTE were detected almost immediately. This is due to the fact that they affected more than one attribute of the ADS-B message. On the other hand, the SHIFT Down and SHIFT Up type of attacks affected only one attribute (altitude), and therefore the delay time was longer.

Figure 10:
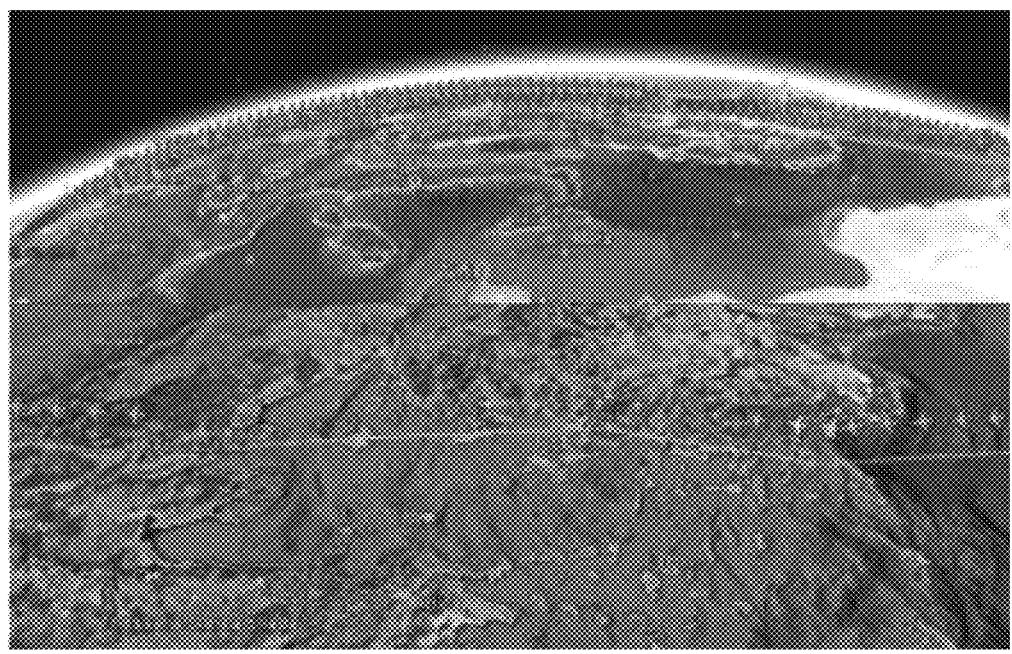
FIG. 10 schematically shows a visualization of the analysis of ADS-B messages for a selected flight from the London dataset which injected with the Gradual Drift anomaly according to an embodiment of the invention.

FIG. 10. Schematically shows a visualization of the analysis of ADS-B messages for a selected flight from the London dataset which injected with the Gradual Drift anomaly (SHIFT DOWN). Each icon indicates the location of the aircraft and represents a window of ADS-B messages. The size of the icon indicates the reported altitude of the aircraft and the color of the icon indicates the anomaly level derived by the relevant model (trained on the London dataset); Red being an anomalous window and Green benign window.

FIG. 11 schematically shows a table of average false-alarm rate of the experiments of the present invention according to an embodiment of the invention.

In an attempt to reduce the rate of false alarms, the results were examined using a collective (aggregative) anomaly by raising an alert only when a sequence of t malicious windows was detected. The detection rate and false alarm rate were examined for t=5, 10, and 15. The results are presented in FIG. 11, which shows a table of the false alarm rate for each dataset and for different values of t averaged for all folds and attacks.

As can be observed from the table in FIG. 11, the lowest false alarm rate was attained for t=15. Note that in all cases the true attack was detected; that is, the detection rate is 1.0.

The invention claimed is:

1. A method for detecting anomalous ADS-B messages in airplanes and air-traffic control system using at least one or more hardware processors, the method comprising:
   a. extracting features from application level data, which is information broadcasted in said ADS-B messages, contextual data and flight plans;
   b. analyzing said extracted features by the one or more hardware processors of each individual airplane and computing relative measures of a flight based on said extracted features;
   c. training a machine learning model to represent a benign ADS-B messages;
   d. applying said machine learning model on said extracted features thereby deriving a reputation score, for verifying the reliability of ADS-B messages received from neighboring aircrafts, the deriving of the reputation score including at least one of the following methods:
      analyzing a correlation between the data in the ADS-B message;
      learning a profile of a flight route using a machine learning model by using previous ADS-B messages flights reports of the same route;
      modeling all airplanes in a specific geolocation and time frame based on said airplanes ADS-B reports and detect anomalous reports; and
      using current flight plans and correlating said plans with the ADS-B messages of said airplane;
   e. for each specific route of each airplane, detecting anomalies resulting from malicious cyber-attacks; and f. issuing a decision based on said score, thereby recognizing an attack and issuing an alarm regarded said recognized attack.

2. A method according to claim 1, wherein the information broadcasted in the ADS-B messages relates to aircraft ID, altitude, location, speed, heading and wherein the contextual data relates to weather, type of plane, airline and destination.

3. A method according to claim 1, wherein the methods for deriving a reputation score are combined to issue a decision.

4. A method according to claim 1, wherein the machine learning model applied is a Markov model or sequence mining algorithms.

5. A method according to claim 1, wherein the machine learning model applied is a deep learning model.

6. A method according to claim 5, wherein the deep learning model is a ANN architecture.

* * * * *